(12) United States Patent
Kurosawa

(10) Patent No.: US 6,298,346 B1
(45) Date of Patent: *Oct. 2, 2001

(54) METHOD AND APPARATUS FOR SUPPORTING COOPERATIVE ACTIVITY

(75) Inventor: Takahiro Kurosawa, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/564,634

(22) Filed: Nov. 29, 1995

(30) Foreign Application Priority Data

Nov. 30, 1991 (JP) .................................................. 6-296993

(51) Int. Cl.[7] .................................................. G06F 17/30
(52) U.S. Cl. .............................. 707/9; 709/223; 711/100
(58) Field of Search .................... 395/684, 677, 395/670, 614, 187.01, 674; 707/2, 8, 9, 10, 103, 11; 380/25; 711/163, 100; 709/223, 300, 104

(56) References Cited

U.S. PATENT DOCUMENTS

| | | | |
|---|---|---|---|
| 4,104,718 | * 8/1978 | Poublan et al. .................... 395/608 |
| 5,113,442 | * 5/1992 | Moir ...................................... 380/25 |
| 5,136,712 | * 8/1992 | Perazolli, Jr. et al. ............. 395/674 |
| 5,173,939 | * 12/1992 | Abadi et al. ......................... 380/25 |
| 5,315,657 | * 5/1994 | Abadi et al. ......................... 380/25 |
| 5,481,715 | * 1/1996 | Hamilton et al. .................... 395/684 |
| 5,504,895 | * 4/1996 | Kurosawa et al. .................... 707/8 |
| 5,627,987 | * 5/1997 | Nozue et al. ........................ 711/200 |
| 5,630,125 | * 5/1997 | Zellweger ............................. 395/614 |
| 5,675,782 | * 10/1997 | Montague et al. ..................... 707/9 |
| 5,701,458 | * 12/1997 | Bsaibes et al. ........................ 707/9 |
| 5,708,812 | * 1/1998 | Van Dyke et al. ................. 395/712 |
| 5,768,516 | * 6/1998 | Swift et al. ............................ 707/9 |
| 5,794,006 | * 3/1999 | Sanderman ......................... 709/223 |
| 5,890,189 | * 3/1999 | Nozue et al. ........................ 711/100 |
| 5,894,573 | * 4/1999 | Fukasawa et al. .................. 707/103 |
| 6,038,543 | * 3/2000 | Kurosawa ............................. 705/11 |
| 6,047,288 | * 4/2000 | Kurosawa et al. ..................... 707/9 |

FOREIGN PATENT DOCUMENTS 2272312    5/1994  (GB).
WO 9309499 5/1993  (WO).

OTHER PUBLICATIONS

IBM Tech. Disc. Bull., vol. 36, No. 10, Oct. 1993, pp. 55–56, "Delegation Method In Access Control".
IBM Tech. Disc. Bull., vol. 32, No. 10A, Mar. 1990, pp. 304–305, "Reference Monitor—Granular Acces Authorization Levels".

* cited by examiner

Primary Examiner—Thomas G. Black
Assistant Examiner—Charles L. Rones
(74) Attorney, Agent, or Firm—Fitzpatrick, Cella, Harper, & Scinto

(57) ABSTRACT

Provided are a method and apparatus for supporting a cooperative activity in which an activity is performed by cooperation among a plurality of participants, as in a television conference system. When another user attempts to participate in the cooperative activity (session), a guardian is assigned to the session and a guardian is assigned also to the user attempting to participate. Allowance or refusal of participation by the user in the session is decided based upon the access control level of the guardian corresponding to the user, a guardian tree defining the path of the guardian and the mutual relationship between the guardians.

14 Claims, 15 Drawing Sheets

[GUARDIAN TREE]

[GUARDIAN PATH]

GUARDIAN #01 : <>
GUARDIAN #02 : <1>
GUARDIAN #03 : <2>
GUARDIAN #04 : <1, 1>
GUARDIAN #07 : <1, 1, 3>
GUARDIAN #08 : <1, 3>
GUARDIAN #09 : <1, 3, 2>
GUARDIAN #13 : <1, 3, 3>
GUARDIAN #21 : <2, 1>
GUARDIAN #22 : <2, 5>
GUARDIAN #24 : <2, 1, 1>

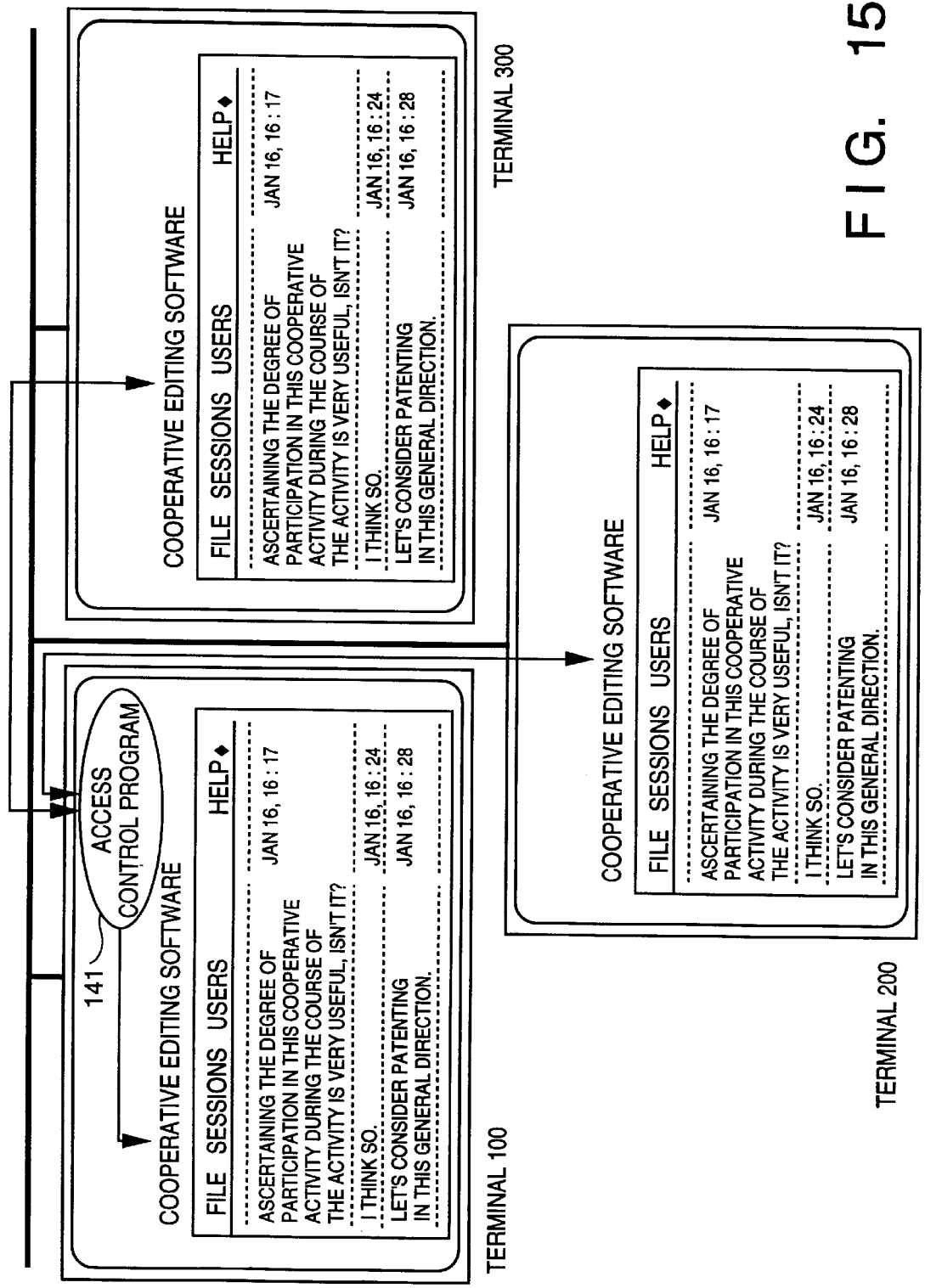

METHOD AND APPARATUS FOR SUPPORTING COOPERATIVE ACTIVITY

BACKGROUND OF THE INVENTION

1. Field of the Invention

This invention relates to a method and apparatus for supporting a cooperative activity in a system such as a television conference system wherein a plurality of participants cooperate to perform an activity.

2. Description of the Related Art

In a cooperative activity environment such as a conventional television conference system, control for participation in the cooperative activity and for access to shared information used in the activity is not satisfactory. The reason for this is as follows: In a single-function, special-purpose cooperative activity system, whether or not participation in the conference is allowed or denied to a person depends upon whether use of the television conference equipment can be acquired from his terminal, as in the manner of a telephone. In addition, by using a dedicated line for the conference system, leakage of information to a third party is prevented. In a case where someone participates in a certain cooperative activity, therefore, participation is allowed without requiring a special check to determine whether or not the participation should be permitted. Furthermore, when access is made to information shared in the cooperative activity, access to the information is allowed merely by simple access control.

Access control carried out in a conventional television conference system will be described with reference to a specific example. In this example, whether participation of a new participant (namely a new writer or new editor) in a cooperative editing activity in a stand-alone computer is allowed or denied is decided based upon static information using a conventional technique similar to that of access control in a UNIX file system. That is, in the access control described here, whether or not participation is allowed is decided based upon the access attributes of shared data to be edited.

First, in order to simplify the description, a name is given to the object of processing. For example, let the cooperative editing activity be "Cooperative Editing #302" and let a new participant be "Participant #46". Each cooperative editing activity has the attribute of the owner, just as in the case of UNIX file system. Similarly, the activity possesses access control attributes classified into three relationships, namely (1) user, (2) group and (3) other, and each has data representing (a) executable, (b) writable and (c) readable or data which is a combination of these data.

Under these settings, processing executed when "Participant #46" requests participation in "Cooperative Editing #302" is as follows:

First, the owner attributes of "Participant #46" and of "Cooperative Editing #302" are compared and it is determined whether the relationship is (1), (2) or (3) above. Next, the access control attribute relevant to this relationship is extracted and whether or not the participation request is allowed is decided based upon this attribute. For example, if "(a) executable" has been designated for the extracted control attribute, then participation becomes possible. In case of other attributes, however, it is decided that participation is not allowed. This is capable of being decided statically irrespective of the status of execution. Such access control processing is executed as part of system call processing of a UNIX operating system in a case where a UNIX file system is accessed, by way of example. In case of the cooperative editing activity described here, the access control processing is incorporated in cooperative activity software for the purpose of carrying out the cooperative editing activity, or an independent dedicated access control unit is prepared and processing is executed. Further, in case of UNIX or the like, access control for accessing a file in a file system and control of participation in a session such as log-in is managed based upon different frameworks. More specifically, with regard to accessing of a file, a decision is made upon referring to access permission set file by file. With regard to log-in, the decision is rendered upon referring to the content of a file "/etc/password".

Moreover, these decisions are rendered statically based upon file access permission or file content and status at the time of execution is not taken into consideration.

The recent popularization of high-performance computers connected by a high-speed network and the development of distributed computing software have made it possible to use a plurality of computers to perform a cooperative activity by a group comprising a plurality of individuals. Under these conditions, control for allowing or denying participation of each participant in a cooperative activity and for accessing information used therein is an important requirement in terms of carrying out the cooperative activity. In other words, in the prior art, access control is performed with regard to static information. However, in a case where a plurality of participants take part in a cooperative activity, it is necessary to carry out control for access to dynamic information for executing a program in the cooperative activity or participating therein. If the foregoing cannot be controlled properly and put to use in the cooperative activity, the progress of the cooperative activity will be impeded. The actual problems that arise when access control in a cooperative activity is not performed correctly are as follows:

(1) a decline in service caused by acceptance of more participants than the capacity for the processing;

(2) leakage of confidential information; and (3) failure of the cooperative activity because of improper quantities of information.

SUMMARY OF THE INVENTION

An object of the present invention is to provide a method and apparatus for supporting a cooperative activity in which it is possible to perform flexible control for accessing data used in a cooperative activity.

Another object of the present invention is to provide a method and apparatus for supporting a cooperative activity in which access control information in a cooperative activity is given in a hierarchical structure and assigned to data used in a cooperative activity so that whether processing is allowed or not can be decided in individual cooperative activities.

A further object of the present invention is to provide a method and apparatus for supporting a cooperative activity in which data in cooperative activity can be accessed dynamically in conformity with the status of execution of the cooperative activity.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 15 is a diagram for describing the constitution of software of a process level according to the first embodiment of the invention.

DESCRIPTION OF THE PREFERRED EMBODIMENTS

Preferred embodiments of the present invention will be described in detail with reference to the accompanying drawings. Before the embodiments are described, however, the factors that characterize the embodiments will be set forth.

(1) Access control information referred to as a "guardian" (described later) is assigned to each resource used in a cooperative activity. As a result, whether start-up of applications for accessing shared data, for participation/withdrawal regarding a cooperative activity and for performing a cooperative activity should be allowed or not can be handled collectively by the framework of access control.

(2) In order to implement the above-described function, use is made of an inclusion program, an assignment program and an evaluation program, which will be described later.

(3) A mutual relationship based upon a hierarchical structure is defined between two guardians and access control is performed in accordance with an access control level set for each mutual relationship.

(4) The mutual relationship between guardians is divided into eight relationships, namely six categories based upon a relationship within the hierarchical structure and two categories provided with special meaning. Among these, the three relationships "_self", "_ancestors" and "_progeny" are essential. Some or all of the other relationships may be dispensable.

(5) Access control levels utilized by guardians are divided into seven levels. Among these, three levels "_none", "_readable" and "_updatable" are essential. Some or all of the other relationships may be dispensable.

(6) Positioning within the hierarchical structure of a guardian is maintained as a path to each guardian.

In this embodiment, access control (control for allowing or refusing participation) in a case where a participant is newly added to a cooperative activity in which a plurality of individuals take part will be described. In particular, an example of processing according to a participation decision program (FIG. 4) will be described in which information for access control is provided for each object that participates in a cooperative activity and allowance or refusal of participation is decided using the provided information.

This embodiment is characterized in that a mutual relationship is defined among the items of information provided for the objects and access control is carried out based upon the mutual relationship.

Assume that the processing of an evaluation program (FIG. 9) referred to at step S11 of the participation decision program (FIG. 4) of this embodiment is executed by an access control program (access control program 141) sharing data space with a cooperative editing program (FIG. 1) for performing a cooperative editing activity.

The construction of a terminal device of a cooperative activity system for explaining this embodiment will be described, followed by a description of the operation thereof.

Figure 1:
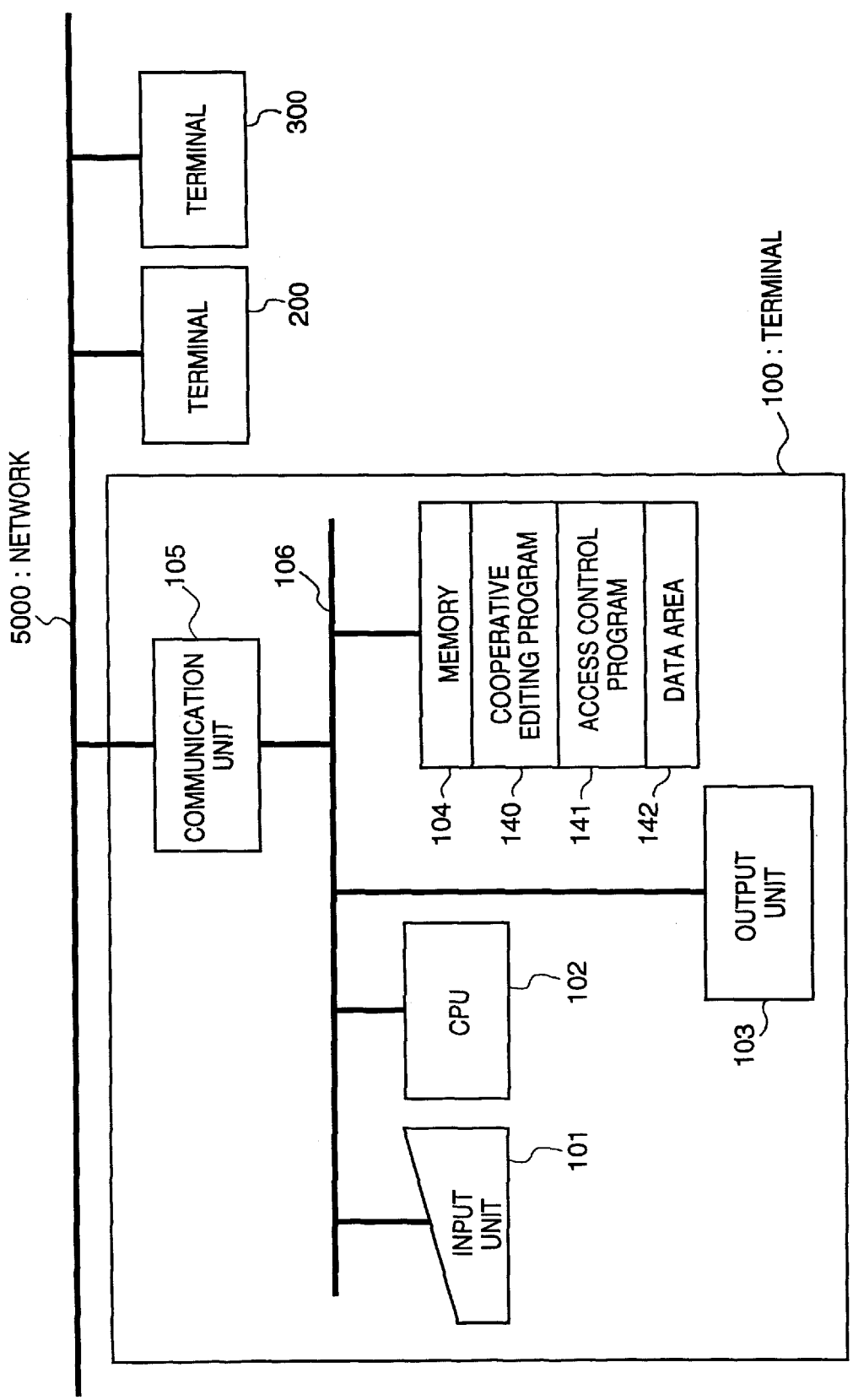
FIG. 1 is a diagram showing the configuration of a cooperative activity system according to an embodiment of the present invention.

FIG. 1 is a system block diagram for describing an embodiment of the invention.

In FIG. 1, a plurality of terminals 100, 200, 300 are connected to a network 5000. Since the terminals are identically constructed, only the construction of terminal device 100 will be described. The terminal device 100 has an input unit 101 that allows the user of the terminal to enter commands and data. The input unit 101 includes a keyboard and a pointing device such as a mouse pad, and a microphone for entering audio. A CPU 102, which controls the entirety of the terminal device 100 of this embodiment, executes software (stored in a memory 104) for a cooperative editing activity, access control, etc. Though one CPU is used in the arrangement of FIG. 1, the hardware configuration may be such that independent CPUs are utilized. An output unit 103 is constituted by a display such as a CRT or; a projector, or a printer. The output unit 103 allows the user to display and output the content of the cooperative editing activity system as well as the results of processing (allowance or refusal of participation) of the participation decision program. In order to simplify the description, display of a plurality of cooperative editing activities is performed by a single output unit. However, independent display devices or printers may be provided for respective ones of the activities.

A memory 104 has program areas 140, 141 for storing programs which implement functions of the cooperative editing activity and participation decision program described in this embodiment, and a data area 142 for storing data utilized by these programs. A plurality of the memories 104 may be provided, a memory that differs for each item of data to be stored may be provided, or the memory may be one of hierarchical form including a secondary storage device such as a hard disk.

The processing functions (programs) saved as programs in the memory 104 are, specifically, a set-up program, a participation decision program, an inclusion program, an assignment program, an evaluation program, a refusal program, an extended evaluation program, a master-tool processing program and a decision program, etc. In FIG. 1, these programs are indicated by the cooperative editing program 140 and an access control program 141. Further, the memory 104 may be divided into a main storage section for storing data used temporarily and a secondary storage section in which a large amount of data is stored permanently. Further, the memory 104 may include a ROM or the like for storing permanent data regardless of the status of the apparatus.

A communication unit 105 such as an FDDI controller is connected to the network 5000. The elements 101~105 mentioned above are joined by a computer bus 106. As mentioned above, the terminals 200, 300 are identical to the terminal device 100 in terms of construction and are for a cooperative editing activity. The terminal devices 100, 200 and 300 allow respective participants to make inputs and outputs and execute processing for cooperative activities. Though a case is described in which the three terminals are connected to a network 5000, there is no limitation upon the number of terminals connected to the network.

The network 5000, which is for implementing a cooperative editing activity, described in this embodiment, by a plurality of computers, includes an Ethernet, FDDI, etc. This embodiment is described with regard to a mode of implementation utilizing general-purpose computers. Consequently, a computer network is used for the purpose of communication. The network may be a wide-area line such as an ISDN.

The constitution of the software executed by the terminal 100 (200, 300) of this embodiment will be described next.

First, the constitution of the software will be described broadly in terms solely of program execution units, e.g., the processes in a UNIX program. When the embodiment is viewed from this standpoint, the cooperative editing program 140 is executed by each of the terminals 100, 200, 300, as shown for example in FIG. 15, and the participants in the cooperative editing activity are placed at respective ones of the separate terminals. Further, in the case of FIG. 15, for example, the access control program 141 of the terminals (e.g., terminal 100) is executed to carry out access control (FIG. 15), described later.

Further, in order to simplify the description, the cooperative editing program 140 and access control program 141 of each terminal share data space, and the data to be processed placed in this shared data space can be referred to or manipulated from any of these terminals in the same manner. In order to realize this, an object-oriented database system or distributed shared-memory technology can be used.

Next, the data used in each of these programs is named.

Figure 5:
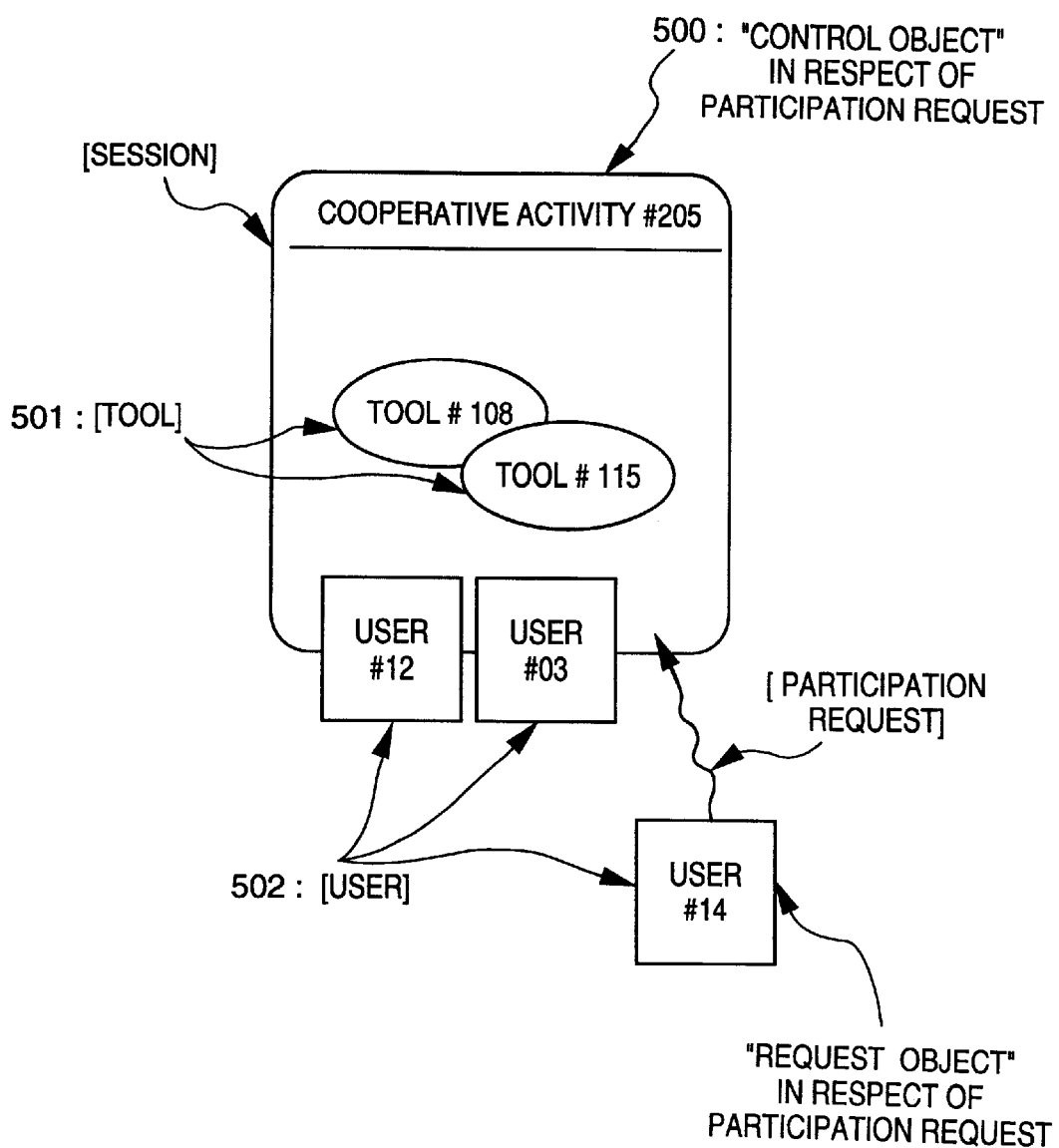
FIG. 5 is a diagram for described shared resources in the first embodiment.

FIG. 5 is a diagram showing the object of processing (hereinafter referred to as the "object") utilized in the description of this embodiment.

In this embodiment, the object of a cooperative activity such as a cooperative editing operation is referred to as a "session" 500, as depicted in FIG. 5. An application object such as drawing software or an editor utilized in the session is referred to as a "tool" 501. An object which is a participant in such a cooperative activity is referred to as a "user" 502. FIG. 5 represents the following state: "Another user 'user #14' is attempting to participate in a 'session' of cooperative activity #205, in which 'users' indicated by user #12 and user #03 are utilizing "tools" referred to as tool #108 and tool #115". The processing of this embodiment becomes necessary under such conditions.

Further, in the description of this embodiment, the object of the side which receives a request for participation and which performs the relevant control is referred to a "control object", as in the manner of the session of a cooperative editing activity. On the other hand, the object of the side which issues the participation request such as the "user #14" 502 is referred to as a "requesting object". This distinction is for the sake of simplicity in a case where attention is focused upon the participation request; no distinction is made between the information represented and the type thereof. For example, a tool which provides a service can be the "control object" or the "requesting object", depending upon the type of operation. An object assigned for each resource and retaining access control information shall be referred to as a "guardian".

Figure 2:
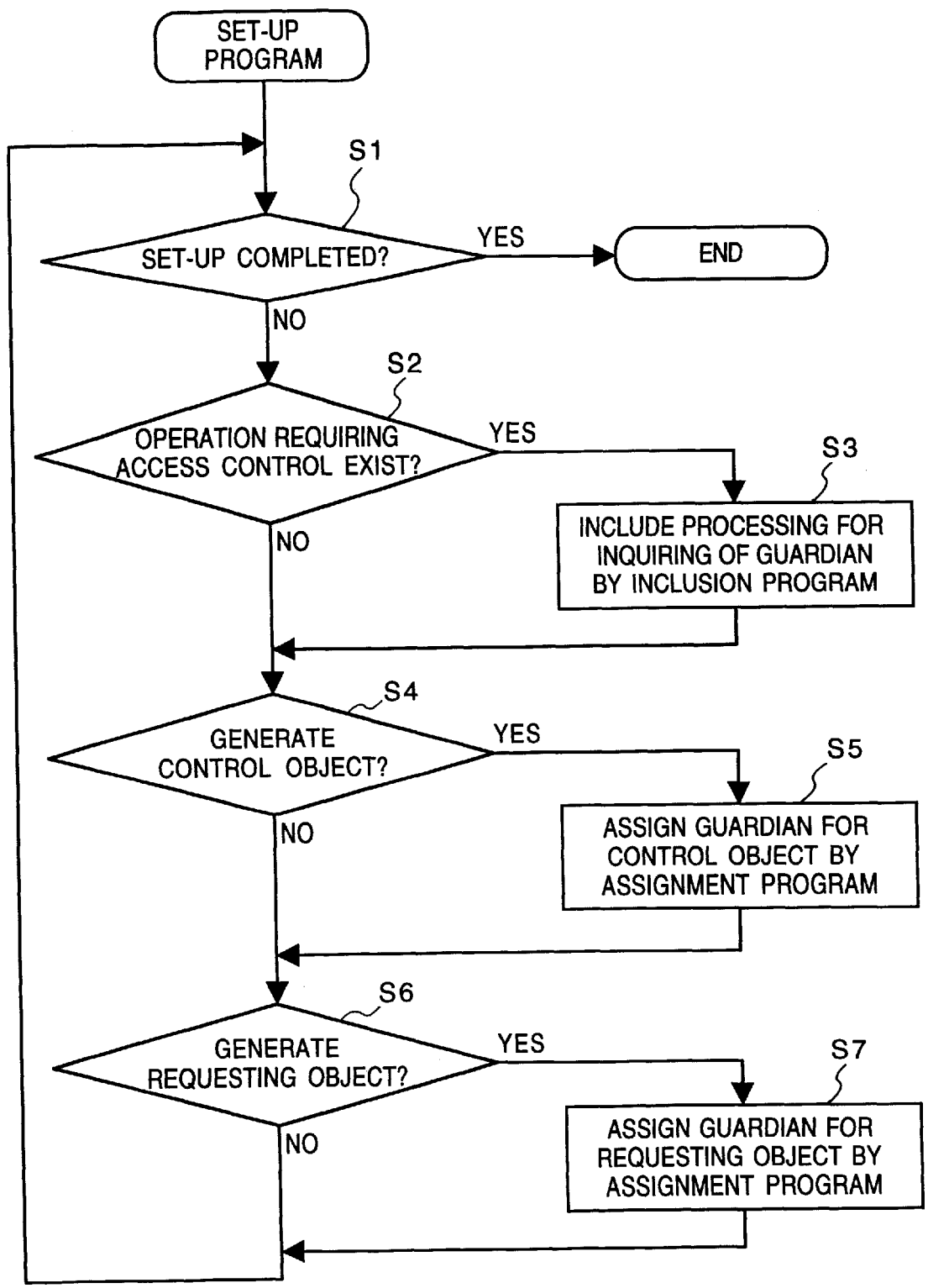
FIG. 2 is a flowchart showing an overview of processing according to a set-up program of a first embodiment of the present invention.
Figure 3:
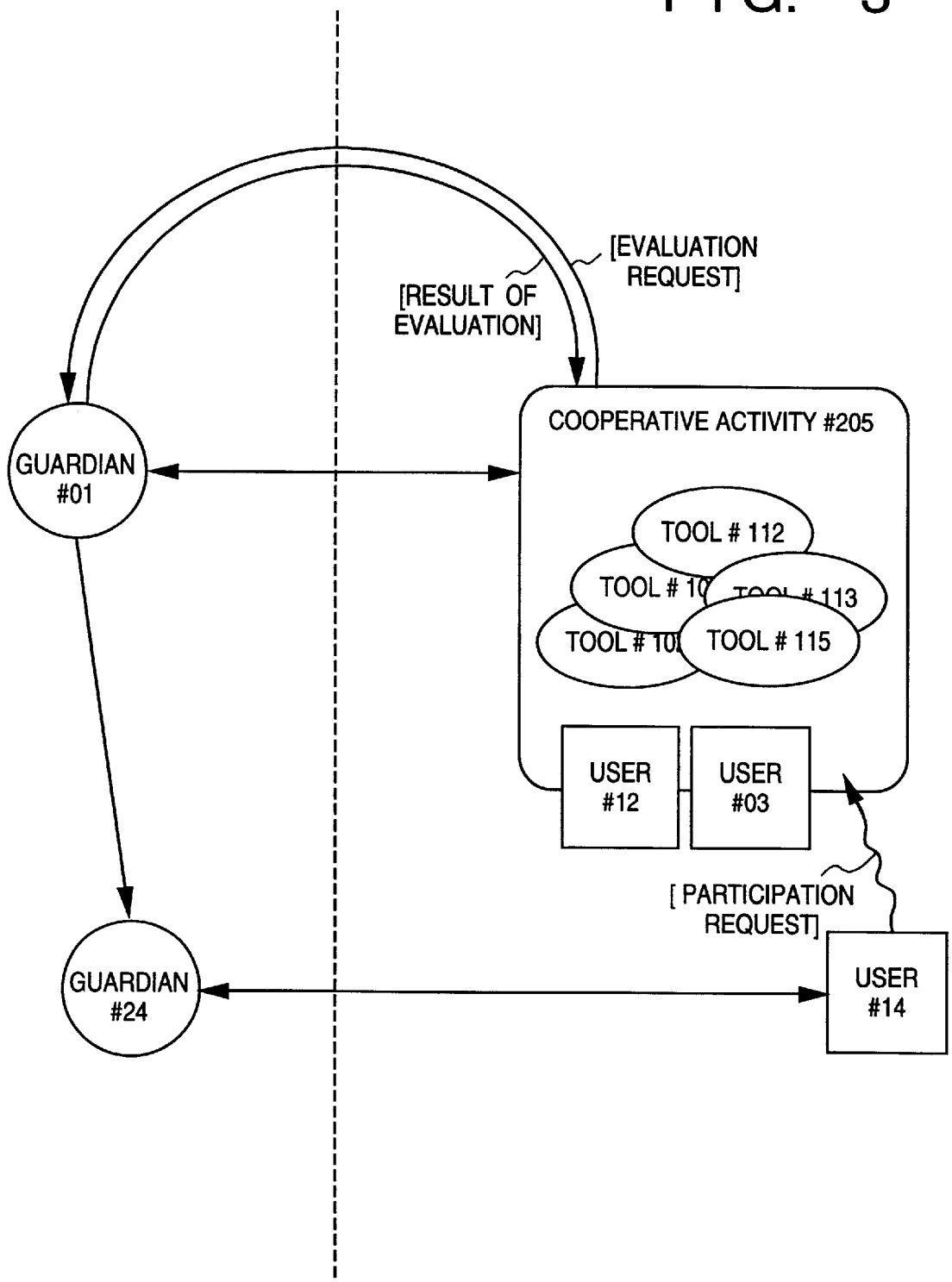
FIG. 3 is a diagram for describing the relationship between shared resources and guardians in the first embodiment.

The operation of a set-up program, indicated by the flowchart of FIG. 2, necessary for access control is described in line with the situation illustrated in FIG. 3. The set-up program performs the three preparatory operations described below with regard to the data of the shared data space of the cooperative editing operation and the processing of the program for the cooperative editing activity. It is required that these preparations be performed prior to the start of processing of the participation decision program (FIG. 4), described later. Further, the preparations (1)~(3) described below need not be carried out in the order of the flowchart shown in FIG. 2.

1. Preparatory operation (1)

At step S2, it is determined whether an operation requiring access control exists. If the answer is "YES", the program proceeds to step S3. Here processing for inquiring of a guardian is included, by the inclusion program of FIG. 7, in the operation requiring access control from the operation of the control object, such as session information. This can be implemented using a technique for functional extension similar to that of a hook function in an Emacs editor, by way of example. In this embodiment, the step S3 corresponds to the inclusion of a participation decision program (FIG. 4) in an operation for adding a new participant (user #14) in the session cooperative activity #205 of FIGS. 3 and 5.

2. Preparatory operation (2)

Figure 8:
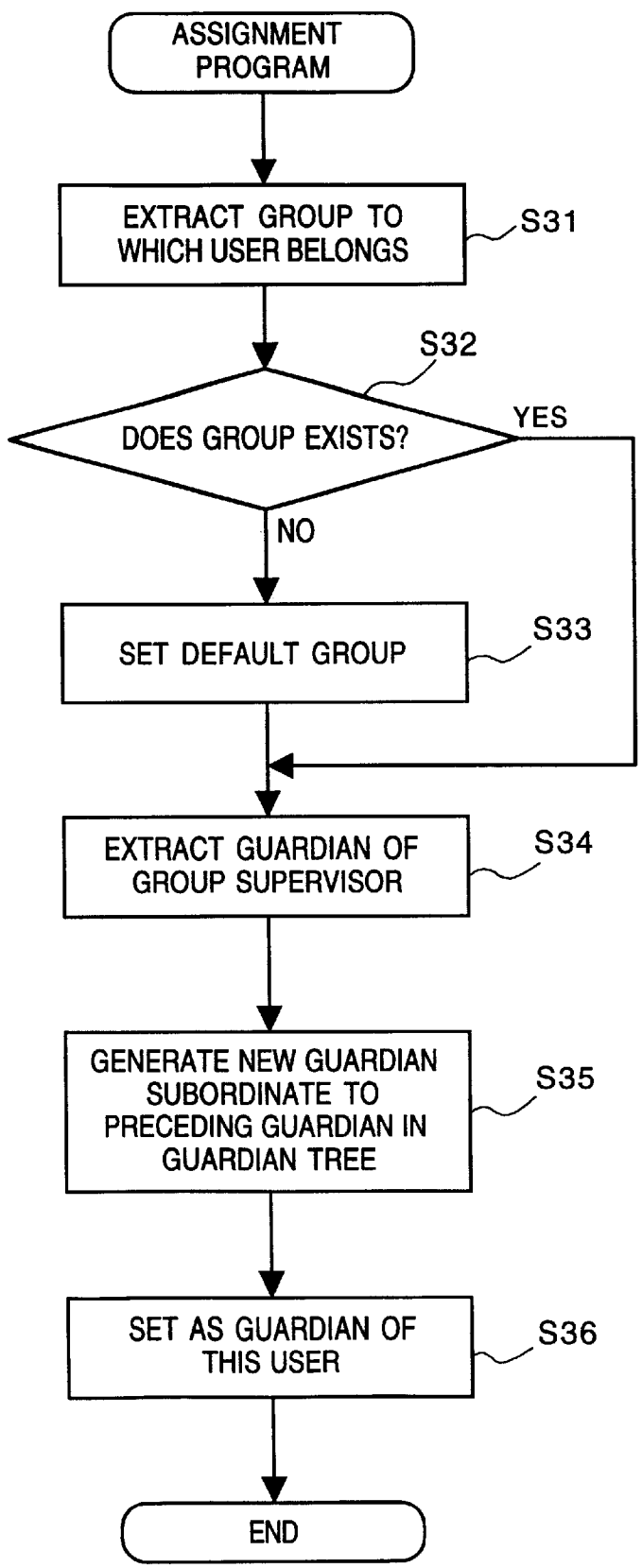
FIG. 8 is a flowchart showing an overview of processing according to an assignment program according to the first embodiment.

Next, when processing for generating a control object is detected at step S4, the program proceeds to step S5, at which a guardian capable of being specified from the control object is assigned by an assignment program (FIG. 8). This may be a newly created guardian or an existing guardian.

In the case of this embodiment, a guardian (guardian #01) is assigned to a session (cooperative activity #205), as shown in FIG. 3.

3. Preparatory operation (3)

When processing for generating a requesting object is detected at step S6, the program proceeds to step S7, at which a guardian capable of being specified from the requesting object is assigned by the assignment program (FIG. 8). Here also the guardian may be one created anew or one already existing.

In the case of this embodiment, a guardian (guardian #24) is assigned to a participant (user #14), as shown in FIG. 3. Furthermore, in this embodiment, it has been described that the same assignment program (FIG. 8) is utilized at steps S5 and S7 in FIG. 2. However, this does not impose a limitation upon the invention and it is permissible to utilize other assignment programs having different assignment policies.

[Overview of operating procedure]

The general features of the operating procedure of processing in this embodiment will now be described. This will then be followed by a description of the details of operation.

Figure 4:
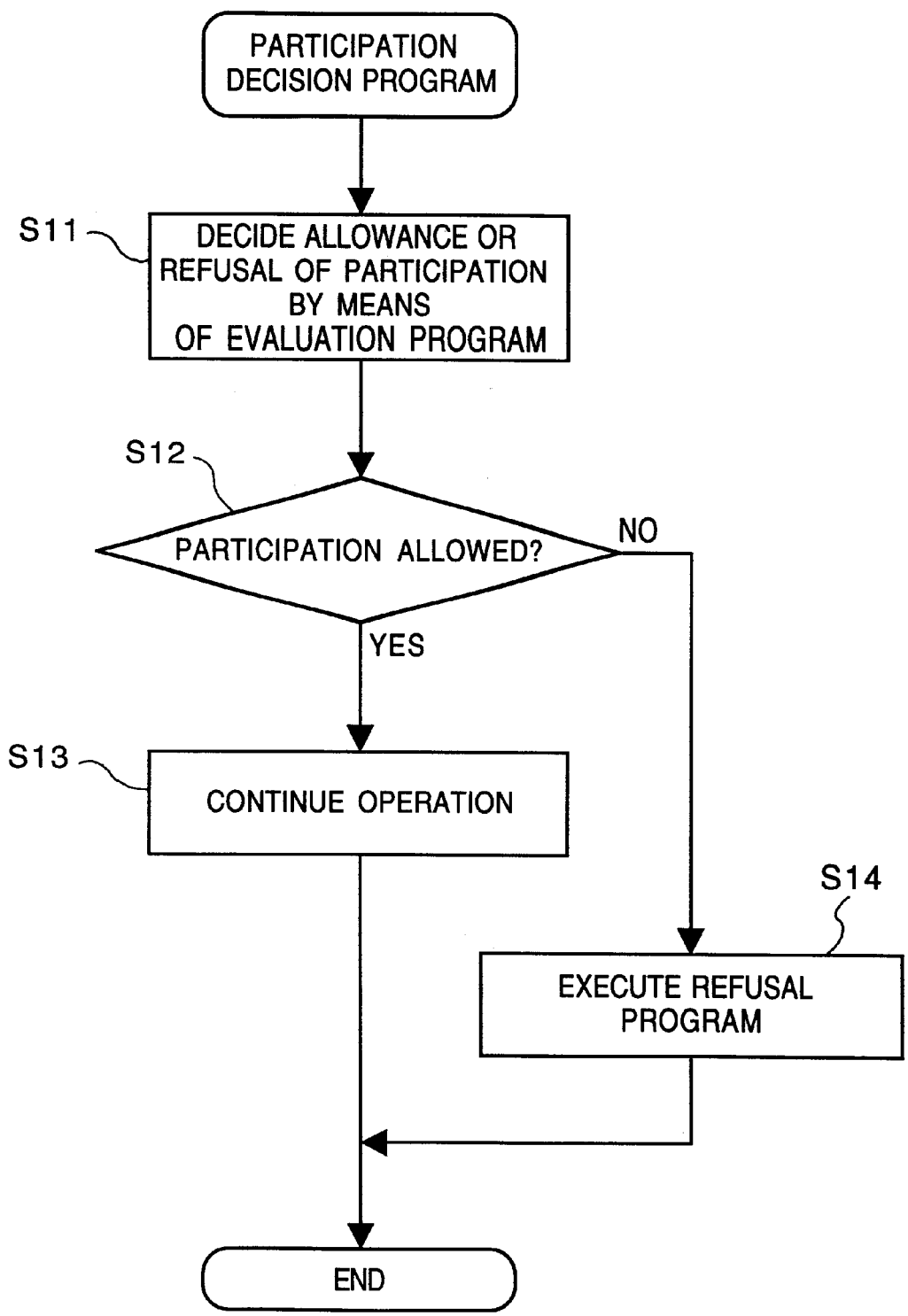
FIG. 4 is a flowchart showing an overview of processing according to a participation decision program of the first embodiment of the present invention.

FIG. 4 is a flowchart showing a processing operation according to a participation decision program in a cooperative editing operation performed in the system of this embodiment. When the cooperative editing program executed by each of the terminals 100, 200, 300 attempts to perform an operation requiring access control at execution of the cooperative editing operation, the operation is executed by sending the access control program 141 an evaluation request for the purpose of access control. More specifically, when the participant "user #14" attempts to participate in session cooperative activity #205, the above is executed by start-up of the participation decision program incorporated by the preparatory operation (1). Further, the evaluation request sent to the access control program 141 can be implemented by an RPC (Remote Procedure Call), by way of example.

First, at step S11, whether a participation request is allowed or not is decided by the evaluation program (FIG. 9) of the access control program 141 based upon the relationship between the guardian (guardian #01) assigned to the session information and the guardian (guardian #24) assigned to the participating user (user #14) information. If participation is allowed at step S12, the program proceeds to step S13, at which operation for adding on a participant is continued.

If participation is not allowed, the program proceeds to step S14, at which a refusal program (FIG. 10) is executed to suspend the operation which adds on the participant. Though access control relating to participation in a session has been described, an operation such as tool execution and group generation or access to information within a session can also be performed by a similar access control program 141.

After the general features of a guardian are described, the details of the operation of each program referred to in the foregoing operation procedure will be described in regular order while referring to the flowchart as necessary.

(a) Guardian access control level

A guardian decides whether or not to allow a request using access control levels set forth below. The correspondence between access control levels and requests allowed by these access control levels are indicated below. The access control levels are listed in order of decreasing restrictions. In other words, the higher the obtained access control level is in the list, the more restrictive the level of access.

| [Control Level] | : | [Request Allowed] |
|---|---|---|
| _none | : | None (all requests are refused) |
| _readable | : | Reference to control object |
| _usable | : | Functional utilization of control object |
| _appendable | : | Alteration by addition to control object |
| _insertable | : | Alteration by insertion in control object |
| _updatable | : | Alteration of control object |
| _deletable | : | Deletion of control object |

Among these, the three levels "_none", "_readable" and "_updatable" are essential; some or all of the others may be dispensable. In this embodiment, an example is described in which a decision regarding the addition of a participant is rendered. It will be assumed that allowance or refusal of addition of a participant is judged depending upon whether the access control level possessed is "_appendable" or higher.

(b) Guardian path and mutual relationship between guardians

Each individual guardian is provided with one path. The path indicates the route to the guardian in a hierarchical structure (hereinafter referred to as a "guardian tree") composed of all guardians in the system. The mutual relationship between guardians is decided, as set forth below, from the positional relationship in the guardian tree. The mutual relationships are listed as follows:

| [Mutual Relationship] | : | [Meaning] |
|---|---|---|
| _self | : | One's own self |
| _sibling | : | Sibling (a guardian having the same parent guardian) |
| _ancestor | : | Ancestor |
| _progeny | : | Progeny |
| _parent | : | Parent (ancestor in the first degree) |
| _child | : | Child (progeny in the first degree) |
| _other | : | No relationship |
| _anonymous | : | Relationship not taken into account |

The two lowermost relationships are special relationships and are not directly connected with the mutual relationships in the guardian tree. These are defined in order that the guardians of the system may be utilized more effectively. In the above-mentioned relationships, the three relationships "_self", "_ancestor" and "_progeny" are essential; some or all of the others may be dispensable.

The relationship between a path and a guardian tree will be described next.

The path uniquely identifies the guardian in the guardian tree. The length (number of elements) of the path indicates the depth (generation, where zero is adopted as the starting point) of the guardian tree, and the value of each indicates the number of the child of the respective parent node. In other words, the nth ($n \geq 1$) value m ($m \geq 1$) from the left of the path indicates that the guardian expressed by this path is the mth child node of the intermediate node of the (n−1)th generation. However, it is assumed that the guardian of the 0th generation is a guardian corresponding to the root node in the guardian tree. Though there are instances in which the guardian is erased, this does not result in a change in the path of the respective guardian already existing. When a child guardian is generated, a path is made to correspond as a child whose value is "value of guardians generated thus far plus one".

Figures 6A, 6B:
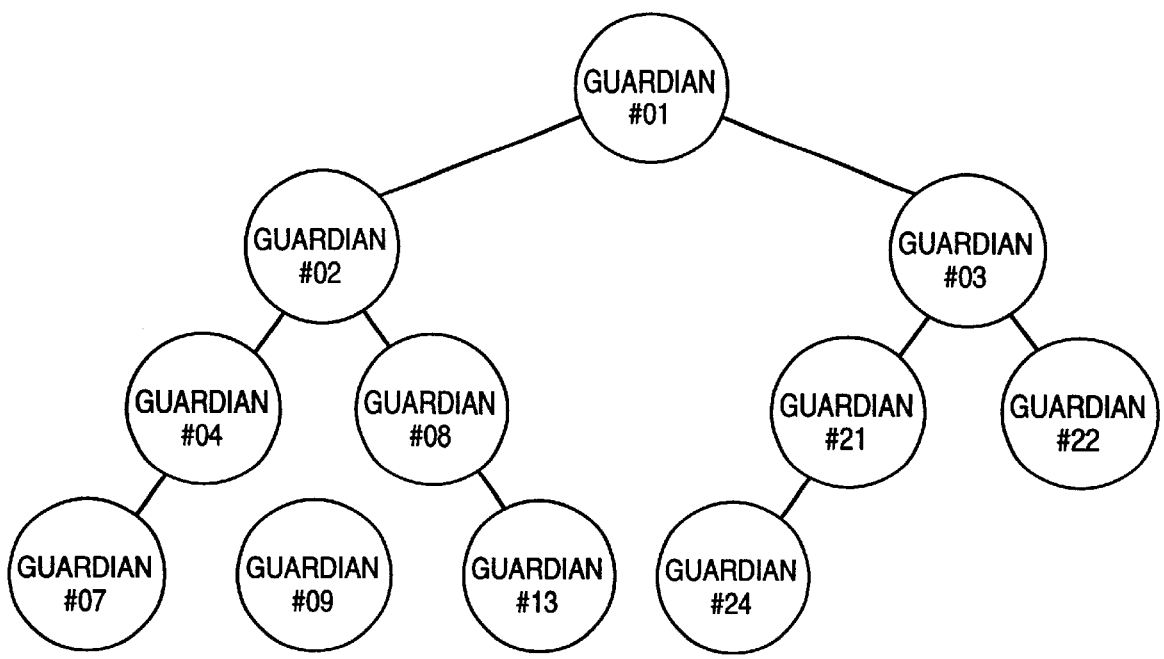
FIG. 6 is a diagram for describing a guardian tree (FIG. 6A) and a guardian path (FIG. 6B) according to the first embodiment.

For example, in a case where all guardians in a certain system form a guardian tree of the kind shown in FIGS. 6A and 6B, a guardian having a path "<1, 1, 3> is indicated by guardian #07 in FIGS. 6A and 6B. This represents a third-generation guardian, specifically the third child "<1, 1, 3> of the first child "<1, 1> (guardian #04) of the first child "<1>" (guardian #02) of the root node.

The assignment of paths at the time of guardian generation will be described in the section on the assignment program (FIG. 8), which is discussed later.

(c) Information possessed by guardian

Each individual guardian, besides being an identifier capable of uniquely defining the guardian, possesses an access control level for each of the eight mutual relationships regarding the paths. The access control level of each mutual relationship is referred to as a control mask below. This access control level is interpreted by the evaluation program (FIG. 9), described later.

In this embodiment, an example is described in which the mutual relationship between guardians is decided by providing a path for each guardian. However, the mutual relationship may be decided by arranging it so that each individual guardian has a link to another guardian.

Figure 7:
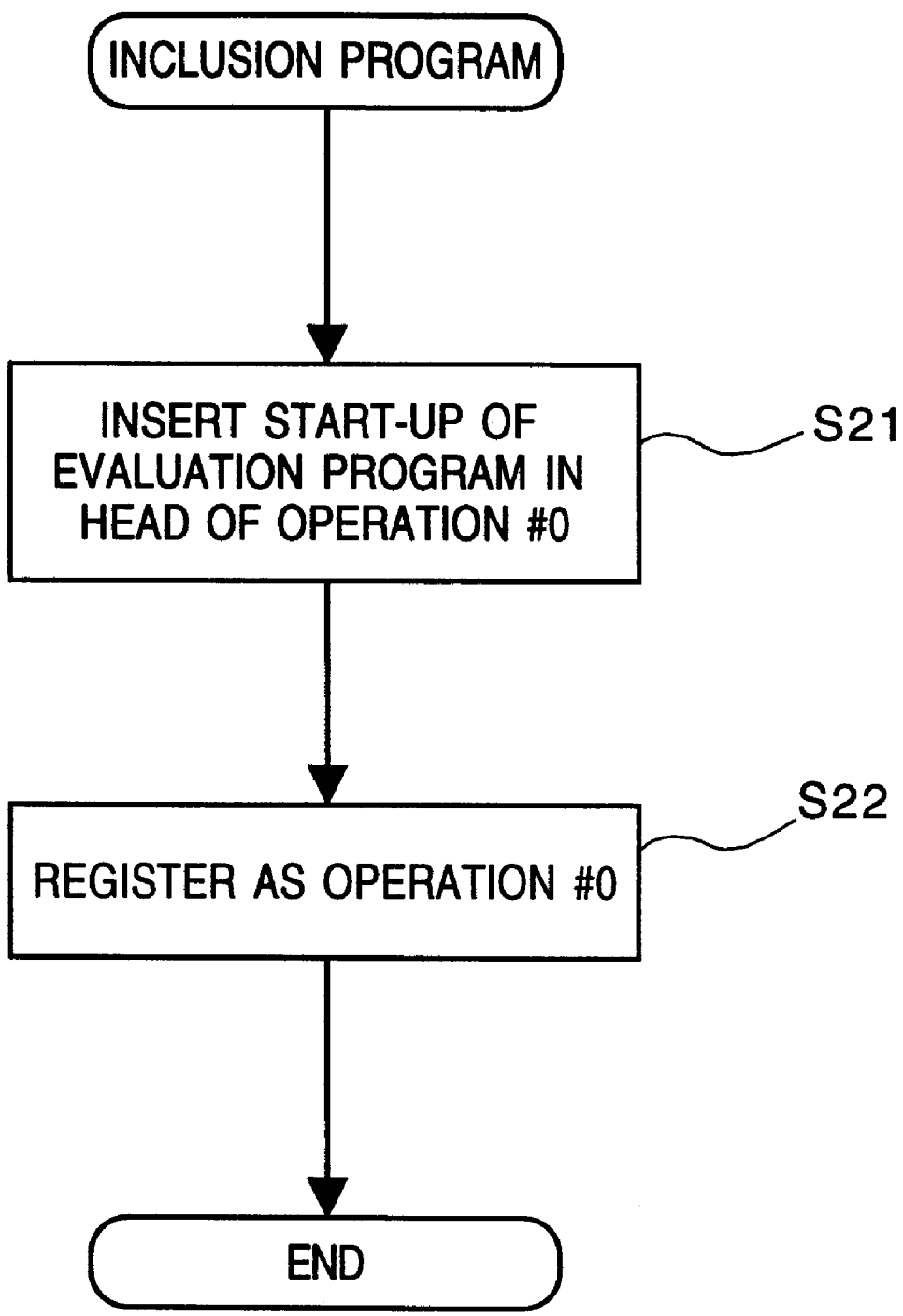
FIG. 7 is a flowchart showing an overview of processing according to an inclusion program according to the first embodiment.

The inclusion program of this embodiment will now be described with reference to the flowchart of FIG. 7. For the purpose of explanation an example will be described in which session information is taken as the control object and an inquiry to a guardian is included in the operation for adding a new participant to the session. In order to clarify the description, the session of interest shall be referred to as "session #0" and the operation for adding on the new participant shall be referred to as "operation #0".

Figure 9:
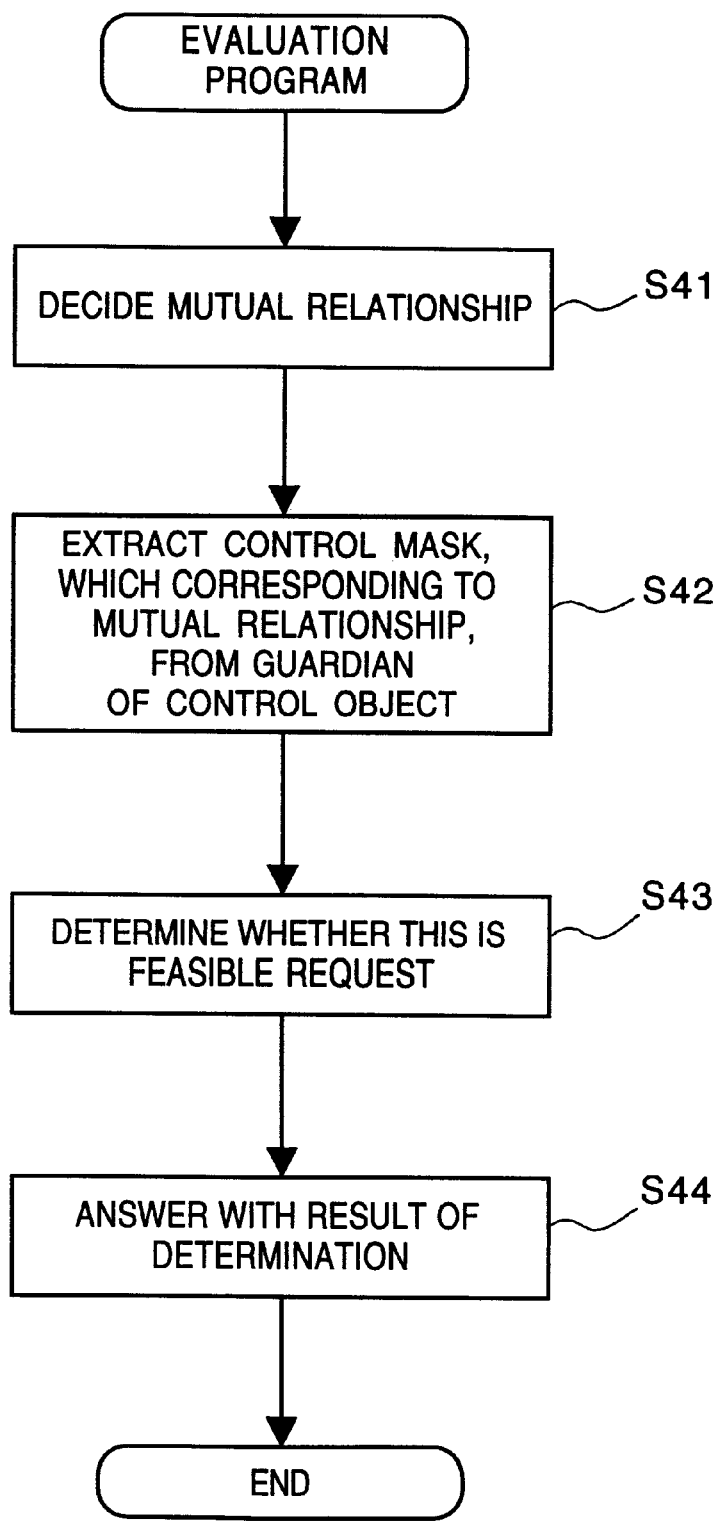
FIG. 9,is a flowchart showing an overview of processing according to an evaluation program according to the first embodiment.

First, at the head of operation #0 of session #0 in step S21, operation #0 is changed so as to start up the evaluation program (FIG. 9). Next, the program proceeds to step S22, at which the operation changed at step S21 is registered as operation #0 of session #0.

Next, the processing of the assignment program of this embodiment will be described with reference to FIG. 8. The assignment program assigns a guardian to each object at generation of the control object or requesting object. Here an example will be described in which a guardian is assigned based upon the group information of a user at generation of the user information.

First, the group to which the user belongs is extracted at step S31. Next, it is determined at step S32 whether the group exists or not. If the group does not exist, the program proceeds to step S33, at which a default group is set, whence the program proceeds to step S34. If the group is found to exist at step S32, on the other hand, then the program proceeds to step S34 without traversing step S33. At step S34, the guardian of the user who is the supervisor of the group is extracted. Assume here that this is "guardian #21". Next, the program proceeds to step S35, at which a guardian is generated anew at a lower order of the guardian tree in FIG. 6A from the path <2,1> of "guardian #21" obtained at step S34. In other words, this guardian is the "_progeny" of guardian #21. It will be assumed here that "guardian #24" has been generated.

The guardian tree of FIGS. 6A, 6B and an example of the paths thereof will now be described. In a case where the path of "guardian #21" is <2,1> and the number of children generated up to this point is "m", "guardian: guardian #24" of path "<2,1,m+1>" will be generated anew. For example, when the value of m is "0", we have "<2,1,1>.

The "guardian #24" thus generated is set as the guardian of this user (user #14) at step S36 in FIG. 8. Though an example has been described in which a guardian is assigned to a user, a similar technique can be applied by referring to, say, session or tool management information with regard to sessions and tools as well. Further, though the example described is one in which a guardian is generated anew and then assigned, it is also possible to extract an appropriate guardian from a group of existing guardians and then assign this guardian. In order to simplify the description, a case has been described in which the number of guardians assigned to a user is "1". However, an arrangement may be adopted in which a plurality of guardians are assigned and each user possesses a list of the guardians. In this case, an appropriate guardian can be selected using the control object of another party as a selection key. Further, a requesting object or the content of the request may be used in order to select an appropriate guardian.

The processing of the evaluation program of this embodiment will be described with reference to the flowchart of FIG. 9. An example utilizing solely a mutual relationship and a control mask in the evaluation program will be described. More specifically, when it is assumed that the guardian is the guardian of a control object, the access control level is decided by selecting one control mask from the mutual relationship between the guardian and the guardian of the requesting object, and the results of evaluation are decided from this access control level. The evaluation program is executed in the access control program.

First, at step S41, the mutual relationship between the guardian (guardian #24) of the requesting object and the guardian (guardian #01) of the control object is decided by referring to the guardian tree of FIG. 6A. In this embodiment, "_progeny" is the result, as set forth above. Next, the program proceeds to step S42, at which the control mask corresponding to the corresponding relationship obtained at step S41 is extracted from the guardian (guardian #01) corresponding to the control object.

Here the description will be based on the assumption that "_appendable" has been obtained. By referring to the access control level indicated by the control mask, it is determined at step S43 whether the request is a feasible request. In other words, whether participation is allowed or denied is being sought in this embodiment, and it is judged depending upon whether the access control level possessed, has a ranking of "_appendable" or greater.

Next, the program proceeds to step S44, at which the result of the determination is given as an answer. In this example, "OK" is the answer. According to this embodiment, merely one control mask in a guardian is utilized as the evaluation condition. However, a situation in which a combination of a plurality of control masks is utilized is also conceivable. Further, according to this embodiment, an example is described in which reference is had only to the control mask of a guardian that has been assigned to a control object. However, it is permissible to utilize the control masks possessed by the guardians of both the requesting object and the control object.

Figure 10:
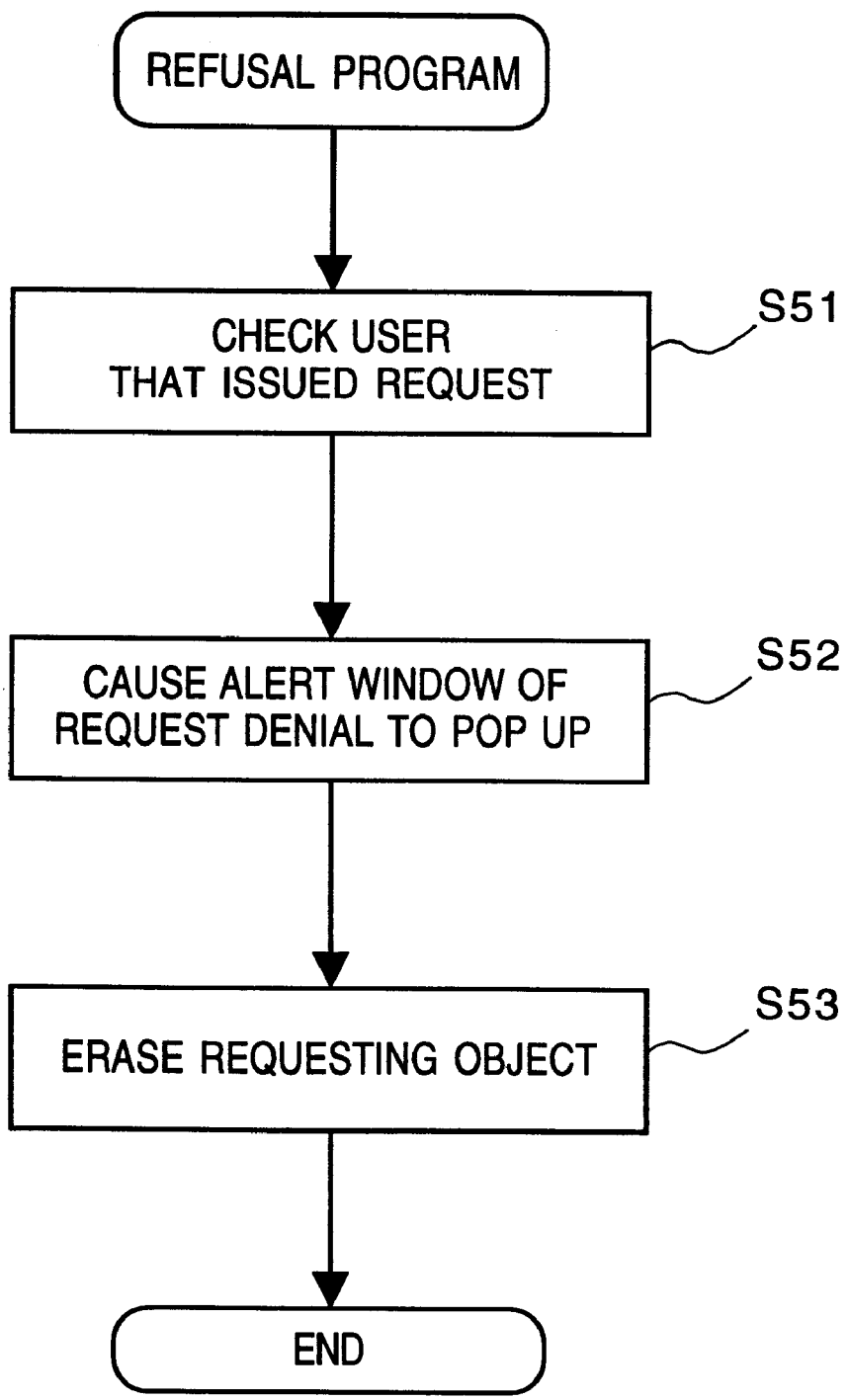
FIG. 10 is a flowchart showing an overview of processing according to a refusal program according to the first embodiment.

FIG. 10 is a flowchart for describing the processing of the refusal program at step S14 in the participation decision program (FIG. 4) of this embodiment. Here an example of a refusal program will be described in which an alert window is made to pop up on the side of the user that issued the participation request.

First, at step S51, the user that issued the request is checked based upon the requesting object. The program then proceeds to step S52, at which an alert window indicating "REQUEST DENIED" is caused to pop up on a display screen in the output unit 103 of the terminal being utilized by the user that issued the request. Next, the program proceeds to step S53, at which the requesting object is erased.

In this embodiment, an example of access control has been described in which allowance or refusal of participation in a cooperative activity is evaluated based solely upon information possessed by a guardian. However, an explanation can be rendered in the same manner also in a case where use is made of other information capable of being acquired when this processing is executed. Further, access control described in this embodiment may be so arranged that in an environment in which communication is performed via a network, the subject matter communicated, e.g., the content of a request or the results of evaluation, is digitally signed, thereby ensuring this subject matter.

In this embodiment, an example has been described in which a program for performing access control is included in processing that is for the purpose of allowing participation in a cooperative activity. However, by including the program in processing for accessing (referring to or updating) shared data or in processing for starting up (tool) or processing for registering a group or user, access control can be applied to each of these processing operations.

This ends the description of the first embodiment.

[Second Embodiment]

A second embodiment of the present invention will now be described. The characterizing features of the second embodiment are as set forth below, although it is not required that the second embodiment be provided with all of these features.

(1) Evaluation of access control is performed by delegation to a program other than the access control program 141. This makes possible dynamic evaluation that takes into account the state of execution of the cooperative activity.

(2) In addition to the access control level(s) in the first embodiment, an access control level for negotiating with another program is defined.

(3) Communication with a program already in execution is performed as a method of negotiating with a program.

Figure 14:
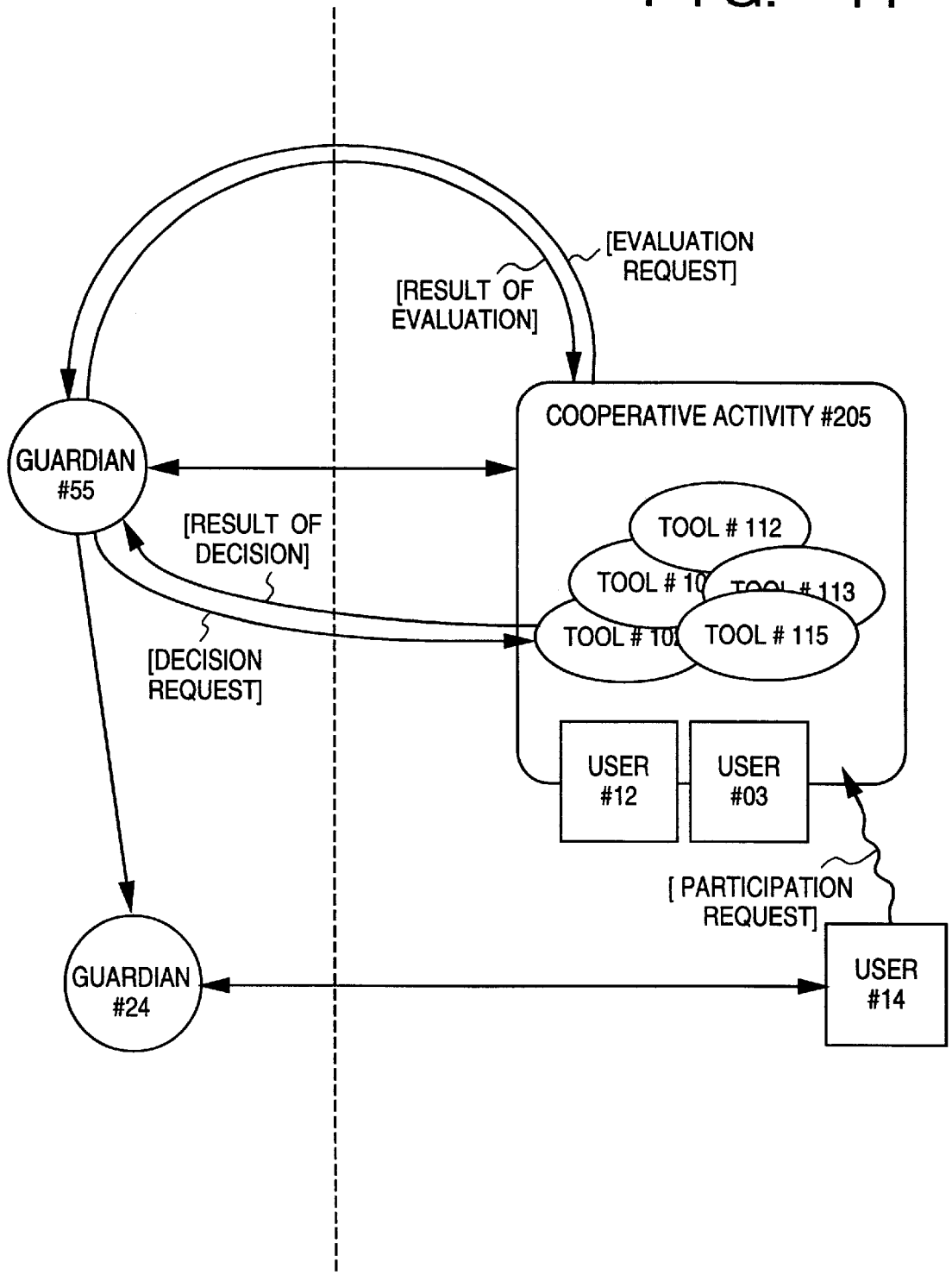
FIG. 14 is a diagram for describing the relationship between shared resources and guardians in the second embodiment.

Control of participation using a guardian in a cooperative editing operation in which a plurality of individuals participate in a manner similar to that of the first embodiment will now be described. As shown in FIG. 14, a feature of this embodiment is that flexible evaluation conforming to the status at the time of execution is made possible by performing evaluation of access control by delegation to a tool. A tool by which a guardian makes an inquiry is referred to as a "master tool" of the guardian. In the example of FIG. 14, a guardian (guardian #55) issues a judgment request to a tool (tool #107) and the tool #107 responds to the request by reporting on the results of the judgment. Accordingly, the tool #107 is the master tool of guardian #55.

In the second embodiment, it is assumed that access control similar to that described above is performed based upon a system configuration similar to that of the first embodiment. However, the access control levels possessed by the guardian are extended so as to allow negotiation with a tool. Accordingly, evaluation is performed using the extended evaluation program of FIG. 11 in place of than the above-mentioned evaluation program.

(a) Extended access control level

As shown below, "_consult" is added as an access control level.

| [Control Level] | [Request Allowed] |
| --- | --- |
| _none | : None *(all requests are refused) |
| _readable | : Reference to control object |
| _usable | : Functional utilization of control object |
| _appendable | : Alteration by addition to control object. |
| _insertable | : Alteration by insertion in control object |
| _updatable | : Alteration of control object |
| _deletable | : Deletion of control object |
| _consult | : Decision based upon result of inquiry to master tool |

Among these, the four levels "_none", "_readable", "_updatable" and "_consult" are essential; some or all of the others may be dispensable.

Figure 11:
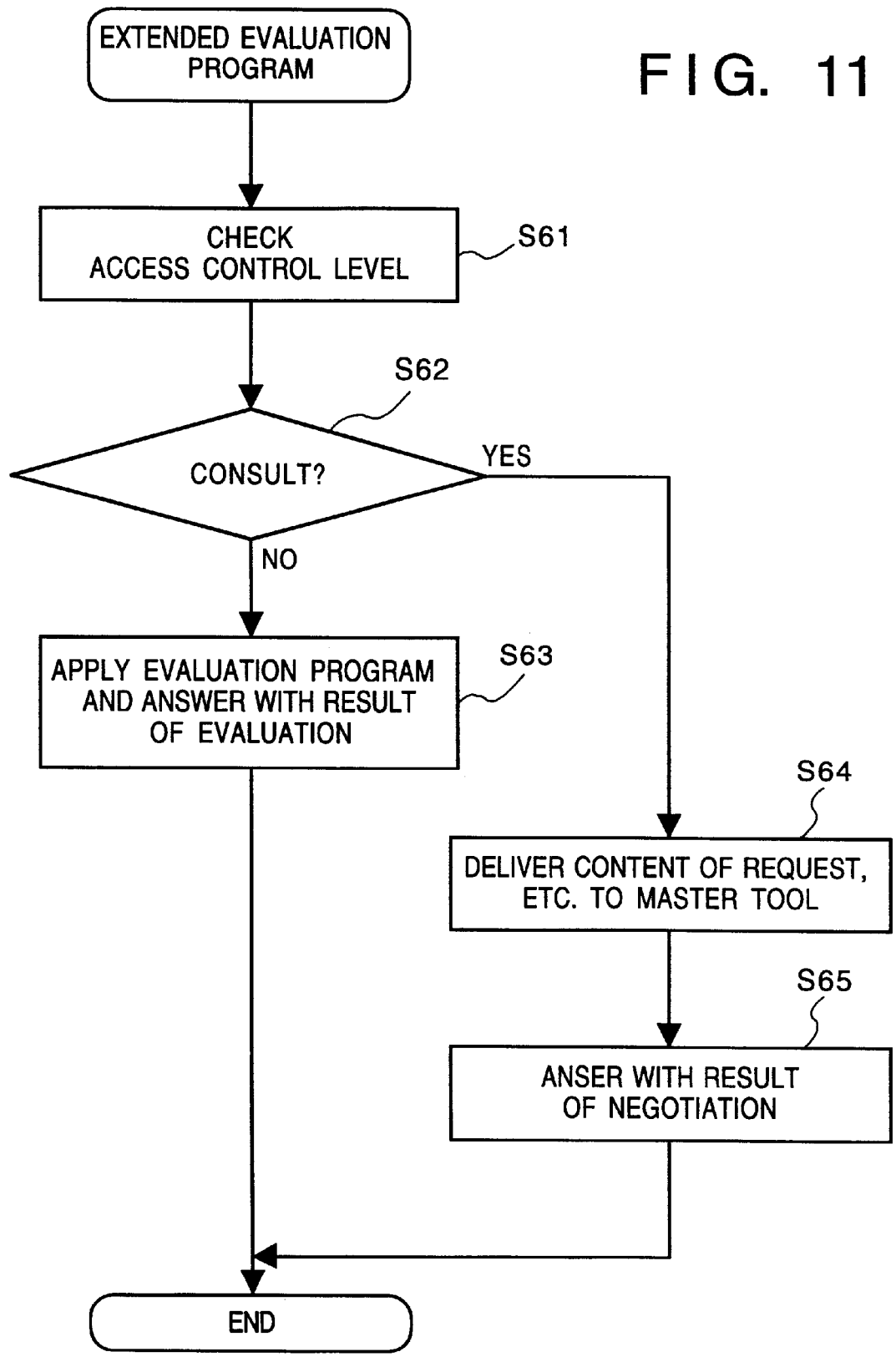
FIG. 11 is a flowchart showing an overview of processing according to an extended evaluation program according to a second embodiment.

FIG. 11 is a flowchart showing an overview of processing according to an extended evaluation program according to the second embodiment. This program is constructed by extending the evaluation program (FIG. 9) of the first embodiment. This will be described in line with FIG. 14. In a case where the access control level is "_consult", the program is extended is such a manner that the evaluation is made by negotiating with the master tool (tool #107) of the guardian (guardian #55). The extended evaluation program is executed in the above-described access control program 141.

First, at steps S61, S62, it is determined whether the access control level is "_consult". If the access control level is not "_consult", then the program proceeds to step S63, at which the result of evaluation obtained by applying the evaluation program (FIG. 9) of the first embodiment is given as the answer.

If the access control level is found to be "_consult" at step S62, on the other hand, then the program proceeds to step S64. Here the content of the request, the identifier of the requesting object and the identifier of the control object are delivered to the master tool as criteria. The program then proceeds to step S65, at which negotiation with the master tool (tool #107) is performed and the result sent back is adopted as the answer.

Figure 12:
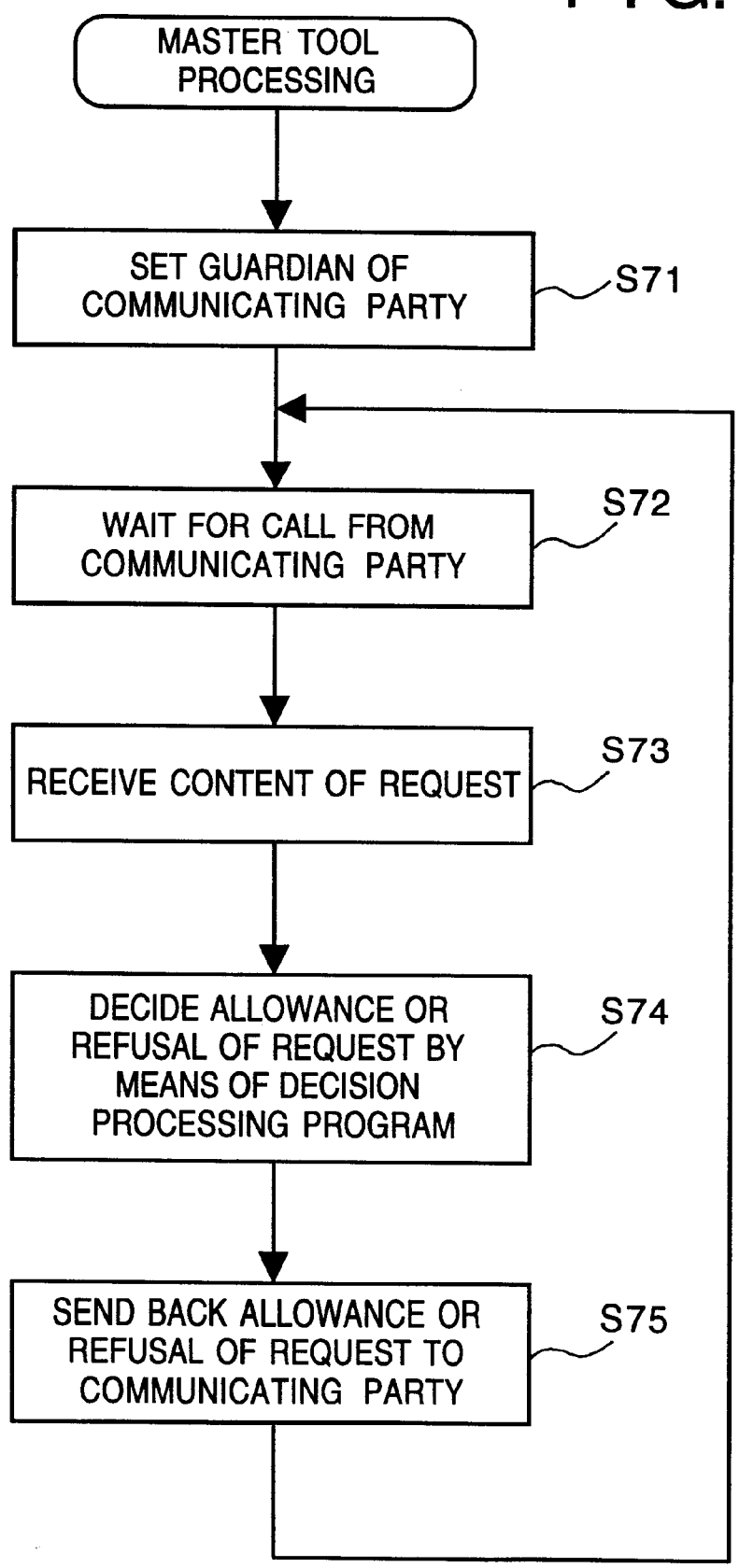
FIG. 12 is a flowchart showing an overview of processing according to a master-tool processing program according to the second embodiment.

FIG. 12 is a flowchart showing an overview of processing according to a master-tool processing program of the second embodiment. Here the operation of the master tool (tool #107) for negotiating with a guardian and assisting the access control program 141 will be described.

First, the guardian (guardian #55) of a communicating party is set at start-up of the master tool (tool #107). Communication with a party other than this guardian is not accepted. Next, the program proceeds to step S72, at which a call from the guardian of the communicating party (guardian #55) is awaited. When there is a call, the content of the request from the guardian (guardian #55), the identifier of the requesting object and the identifier of the control object are accepted as criteria.

In the second embodiment, the content of the request is "request to participate in session", the identifier of the requesting object is "identifier of user #14", and the identifier of the control object is "identifier of cooperative activity #205".

Next, the program proceeds to step S74, at which either allowance or refusal of the request is decided by the decision program. This is followed by step S75, at which allowance or refusal of the request is sent back to the guardian of the communicating party (guardian #55), after which the program returns to step S72. Here negotiation is performed by communication with the process which is executing the program. However, an arrangement may be adopted in which the program is started up anew each time a request is made.

Figure 13:
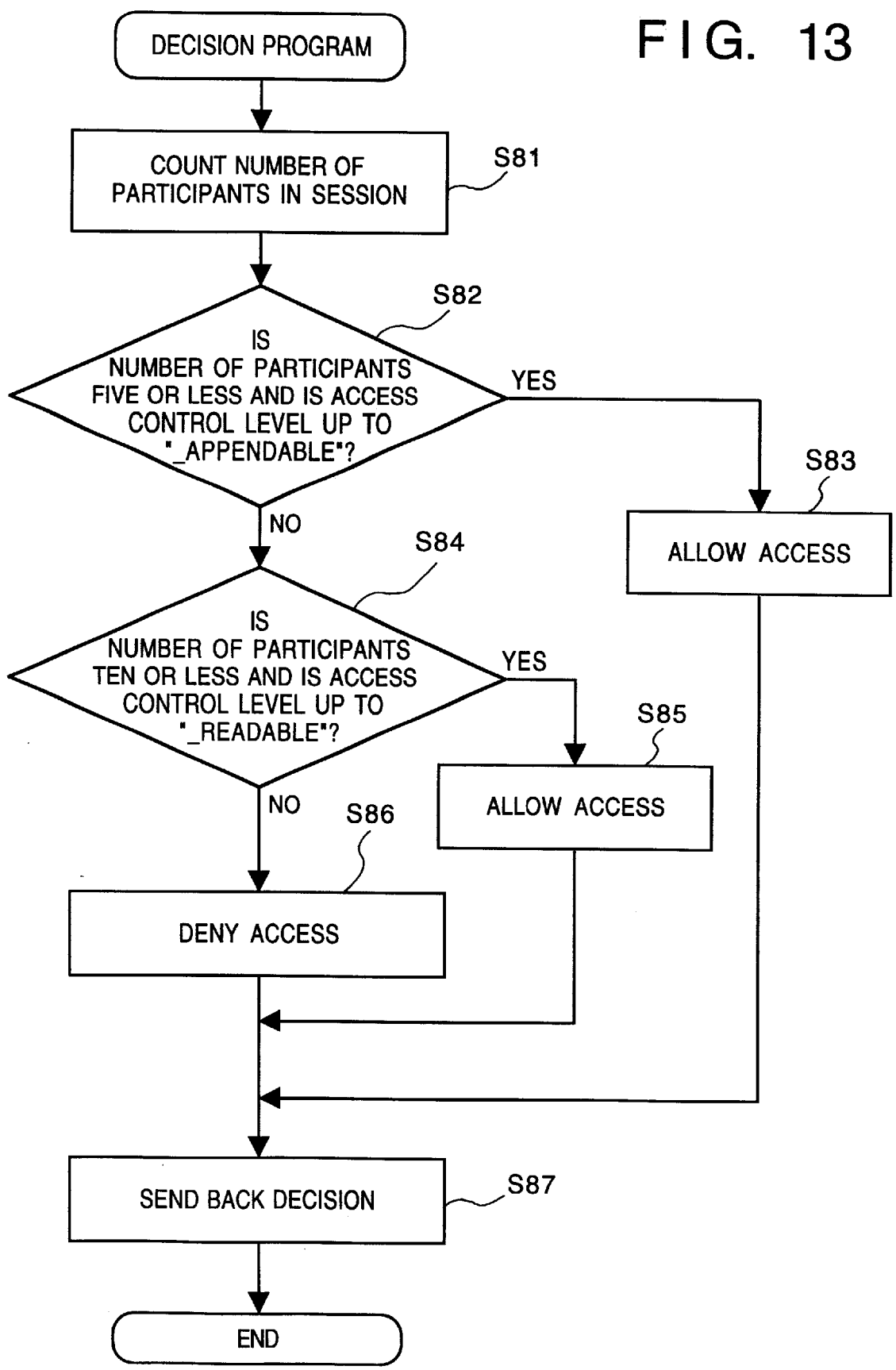
FIG. 13 is a flowchart showing an overview of processing according to a decision program of the second embodiment.

FIG. 13 is a flowchart showing processing according to the decision program referred to at step S74 in FIG. 12. Allowance or refusal of a request is decided upon scrutinizing the criteria set to the master tool (tool #107). In the example described here, which relates to the addition of participants to a session, a case will be set forth in which "access inclusive of alteration is prohibited when the number of participants in a cooperative activity exceeds five, and all access is prohibited when the number of participants in the cooperative activity exceeds ten". This decision program is executed in the master tool (master tool #107 in this example).

First, at step S81 in FIG. 13, the number of participants in cooperative activity #205 of the control object is counted. It is determined at step S82 whether the number of participants is five or less and whether the access control level is up to "_appendable". If the answer is "YES", then the program proceeds to step S83, at which the request is allowed. In other words, in the second embodiment, "_appendable" is required for the decision regarding the adding on of participants. When this condition is satisfied, therefore, the request to add on participants is allowed.

When the condition of step S82 is not satisfied, the program proceeds to step S84, at which it is determined whether the number of participants is ten or less and whether the access control level is up to "_readable". If the answer is "YES", then the program proceeds to step S85, at which the request is allowed. If the decisions rendered at steps S82 and S84 are both "NO", the program proceeds to step S86, at which access in response to the request is not allowed. This is followed by step S87, at which the result of the decision obtained at any of steps S83, S85, S86 is sent back.

An example has been described in which the allowance or refusal of participation is decided based upon the number of participants in a cooperative activity. However, the invention is applicable also to data reference and data writing. Though the number of participants has been used as a criterion for making judgments, criteria may also be obtained in the status of shared resources, the communication load upon the network, the load upon the computer, the number of applications run within the computer, etc.

Further, an arrangement is conceivable in which a request accepted by a master tool is registered in advance and a decision is made in dependence upon the history of the request. Though an example has been described in which the access control level is decided within one tool, it is possible to perform more flexible judgment of status by making a decision reached by negotiation among a plurality of tools.

Conversely, one tool may accept requests from a plurality of guardians and results of decisions on access control may be altered whenever required in dependence upon the status of these requests or the history of the requests In accordance with the second embodiment, as described above, access control information placed in a guardian tree is assigned to each resource in a cooperative activity and allowance or refusal of processing is decided in each individual operation, thereby making flexible, unified access control possible.

Further, dynamic access control which takes into account the status of execution of a cooperative activity can be implemented by performing a decision on access control with regard to each resource in a cooperative activity by a program that is being executed.

As a result of the foregoing, the following effects are obtained:
(1) it is possible to obtain an appropriate service level based upon participants capable of being accommodated by the processing capacity of the system;
(2) the security of confidential information is maintained; and
(3) a smooth cooperative activity based upon suitable supply of information is assured.

<Other Embodiment>

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS or the like working on the computer performs a part or entire processes in accordance with designations of the program codes and realizes functions according to the above embodiments.

Furthermore, the present invention also includes a case where, after the program codes read from the storage medium are written in a function extension board which is inserted into the computer or in a memory provided in a function extension unit which is connected to the computer, CPU or the like contained in the function extension board or unit performs a part or entire process in accordance with designations of the program codes and realizes functions of the above embodiments.

The present invention is not limited to the above embodiments and various changes and modifications can be made within the spirit and scope of the present invention. Therefore, to apprise the public of the scope of the present invention, the following claims are made:

What is claimed is:

1. A method of supporting a cooperative activity in which an activity is performed by cooperation over a network among a plurality of participants each comprising a terminal connected to the network, said method comprising:

a step of assigning access control information specifying a level of an allowable access operation for a respective one of a plurality of predetermined relationships between a resource and a requesting participant with respect to each of the resources;

a step of entering one of a group of access requests from a requesting participant with a respective access level to one of the resources, the group of access requests including an access request to the shared data, a request for participating in the cooperative activity, or a request for executing a program as an access request for the program; and a decision step of deciding whether to allow or refuse the request entered in said entering step as the access request for the one resource, wherein said decision step allows the request if the respective access level is not higher than the level specified in the access control information assigned to the relationship between the one resource and the requesting participant.

2. A method of supporting a cooperative activity in which an activity is performed by cooperation among a plurality of participants, said method comprising:

a step of entering an access request with respect to the cooperative activity; and a decision step of deciding whether to allow or refuse the access request in relation to at least a list of participants in the cooperative activity, shared data, and an executable program, wherein said decision step includes a step of assigning access control information to each participant in the list of participants in the cooperative activity, each shared data, and each executable program, respectively, and rendering a decision based upon the access control information and the access request, and wherein the access control information has at least the following three access control levels:

| [Control Level] | : | [Request Allowed] |
|---|---|---|
| _none | : | None |
| _readable | : | Reference to object which receives request |
| _updatable | : | Alteration of object which receives request. |

3. The method according to claim 2, wherein the access control information includes an access control level in which a level "_consult", which is for negotiating with a program, has been added.

4. The method according to claim 2, wherein the access control information further includes any of the following four access control levels or a combination thereof:

| [Control Level] | : | [Request Allowed] |
|---|---|---|
| _usable | : | Functional utilization of object which receives request |
| _appendable | : | Alteration by addition to object which receives request |
| _insertable | : | Alteration by insertion in object which receives request |
| _deletable | : | Deletion of object which receives request. |

5. A method of supporting a cooperative activity in which an activity is performed by cooperation among a plurality of participants, said method comprising:

a step of entering an access request with respect to the cooperative activity; and a decision step of deciding whether to allow or refuse the access request in relation to at least a list of participants in the cooperative activity, shared data, and an executable program, wherein said decision step includes a step of assigning access control information to each participant in the list of participants in the cooperative activity, each shared data, and each executable program, respectively, and rendering a decision based upon the access control information and the access request, and wherein the access control information uses a group of access control information arranged in a tree structure and a relationship between access control information corresponding to a node thereof is defined by at least the following:

| [Mutual relationship] | : | [Meaning] |
|---|---|---|
| _self | : | Self |
| _ancestor | : | Ancestor |
| _progeny | : | Progeny. |

6. The method according to claim 5, wherein the tree structure maintains a relative positive relationship between nodes constructing a tree.

7. The method according to claim 5, wherein the tree structure is such that an absolute position in the tree structure is maintained within individual items of access control information.

8. The method according to claim 5, wherein the access control information further includes any of the following five mutual relationships or combinations thereof:

| [Mutual Relationship] | : | [Meaning] |
|---|---|---|
| _sibling | : | Sibling (a node having the same parent node |
| _parent | : | Parent (ancestor in the first degree) |
| _child | : | Child (progeny in the first degree) |
| _other | : | No relationship |
| _anonymous | : | Relationship not taken into account. |

9. An apparatus for supporting a cooperative activity in which an activity is performed by cooperation over a network among a plurality of participants each comprising a terminal connected to the network, said apparatus comprising:

an assignment circuit adapted to assign access control information specifying a level of an allowable access operation for a respective one of a plurality of predetermined relationships between a resource and a requesting participant with respect to each of the resources;

an input circuit adapted to enter one of a group of access requests from a requesting participant with a respective access level to one of the resources, the group of access requests including an access request to the shared data, a request for participating the cooperative activity, or a request for executing a program as an access request for the program; and a decision circuit adapted to decide whether to allow or refuse the request entered by said input circuit as the access request for the one resource, wherein said decision circuit allows the request if the respective access level is not higher than the level specified in the access control information assigned to the relationship between the one resource and the requesting participant.

10. An apparatus for supporting a cooperative activity in which an activity is performed by cooperation among a plurality of participants, said apparatus comprising:

an input circuit adapted to enter an access request with respect to the cooperative activity; and a decision circuit adapted to decide whether to allow or refuse the access request in relation to at least a list of participants in the cooperative activity, shared data, and an executable program;

an assignment circuit adapted to assign access control information to each participant in the list of participants in the cooperative activity, each shared data, and each executable program, respectively; and an evaluation circuit adapted to render a decision to allow or refuse participation based upon the access control information and the access request, wherein the access control information has at least the following three access control levels:

| [Control Level] | : | [Request Allowed] |
|---|---|---|
| __none | : | None |
| __readable | : | Reference to object which receives request |
| __updatable | : | Alteration of object which receives request. |

11. The apparatus according to claim 10, wherein the access control information includes an access control level in which a level "__consult", which is for negotiating with a program, has been added.

12. The method according to claim 10, wherein the access control information further includes any of the following four access control levels or a combination thereof:

| [Control Level] | : | [Request Allowed] |
|---|---|---|
| __usable | : | Functional utilization of object which receives request |
| __appendable | : | Alteration by addition to object which receives request |

-continued

| [Control Level] | : | [Request Allowed] |
|---|---|---|
| __insertable | : | Alteration by insertion in object which receives request |
| __deletable | : | Deletion of object which receives request. |

13. An apparatus for supporting a cooperative activity in which an activity is performed by cooperation among a plurality of participants, said apparatus comprising:

an input circuit adapted to enter an access request with respect to the cooperative activity; and a decision circuit adapted to decide whether to allow or refuse the access request in relation to at least a list of participants in the cooperative activity, shared data, and an executable program;

an assignment circuit adapted to assign access control information to each participant in the list of participants in the cooperative activity, each shared data, and each executable program, respectively; and an evaluation circuit adapted to render a decision to allow or refuse participation based upon the access control information and the access request, wherein the access control information uses a group of access control information arranged in a tree structure and a relationship between access control information corresponding to a node thereof is defined by at least the following:

| [Mutual relationship] | : | [Meaning] |
|---|---|---|
| __self | : | Self |
| __ancestor | : | Ancestor |
| __progeny | : | Progeny. |

14. The apparatus according to claim 13, wherein the access control information further includes any of the following five mutual relationships or combinations thereof:

| [Mutual Relationship] | : | [Meaning] |
|---|---|---|
| __sibling | : | Sibling (a node having the same parent node |
| __parent | : | Parent (ancestor in the first degree) |
| __child | : | Child (progeny in the first degree) |
| __other | : | No relationship |
| __anonymous | : | Relationship not taken into account. |

* * * * *

UNITED STATES PATENT AND TRADEMARK OFFICE
CERTIFICATE OF CORRECTION

PATENT NO. : 6,298,346 B1
DATED : October 2, 2001
INVENTOR(S) : Takahiro Kurosawa It is certified that error appears in the above-identified patent and that said Letters Patent is hereby corrected as shown below:

Title page,
Item [30], Foreign Application Priority Data,
"Nov. 30, 1991 (JP)" should read -- Nov. 30, 1994 (JP) --.

Item [56], References Cited, OTHER PATENT DOCUMENTS,
"Acces" should read -- Access --.

Drawings,
Sheet 8,
Figure 8, "EXISTS?" should read -- EXIST? --.
Sheet 11,
Figure 11, "ANSER" should read -- ANSWER --.

Column 3,
Line 27, "FIG. 9,is" should read -- FIG. 9 is --.

Column 4,
Line 7, "_ancestors" should read -- _ancestor --.
Line 55, "or;" should read -- or --.

Column 5,
Line 45, "UNIX" should read -- UNIX operating system --.

Column 6,
Line 12, "to" should read -- to as --.

Column 12,
Line 1, "than" should be deleted.

Column 16,
Line 44, "node" should read -- node) --.

UNITED STATES PATENT AND TRADEMARK OFFICE
CERTIFICATE OF CORRECTION

PATENT NO.    : 6,298,346 B1
DATED         : October 2, 2001
INVENTOR(S)   : Takahiro Kurosawa It is certified that error appears in the above-identified patent and that said Letters Patent is hereby corrected as shown below:

Column 17,
Line 1, "participating" should read -- participating in --.

Column 18,
Line 48, "node" should read -- node) --.

Signed and Sealed this

Thirtieth Day of April, 2002

Attest:

Attesting Officer

JAMES E. ROGAN
Director of the United States Patent and Trademark Office